United States Patent
Sridharan et al.

[11] Patent Number: 6,124,224
[45] Date of Patent: Sep. 26, 2000

[54] HIGH TEMPERATURE SEALING GLASS

[75] Inventors: Srinivasan Sridharan; Tack J. Whang, both of Strongsville; Gordon J. Roberts, Parma, all of Ohio

[73] Assignee: Ferro Corporation, Cleveland, Ohio

[21] Appl. No.: 09/145,112

[22] Filed: Sep. 2, 1998

[51] Int. Cl.⁷ .................................. C03C 8/24; C03C 8/14
[52] U.S. Cl. .................................. 501/15; 501/17; 501/21; 501/64; 501/66; 501/67; 501/69; 501/77; 501/78; 204/424
[58] Field of Search .................................. 501/15, 21, 17, 501/64, 66, 67, 69, 77, 78; 204/424

[56] References Cited

U.S. PATENT DOCUMENTS

| | | | |
|---|---|---|---|
| 2,642,633 | 6/1953 | Dalton | 20/56.5 |
| 3,123,470 | 3/1964 | Denison, Jr. | 75/201 |
| 3,258,350 | 6/1966 | Martin et al. | 106/47 |
| 3,951,669 | 4/1976 | Malmendier et al. | 106/39.6 |
| 4,221,604 | 9/1980 | Chirino et al. | 106/286.5 |
| 4,310,402 | 1/1982 | Isenberg et al. | 204/195 |
| 4,571,285 | 2/1986 | Nakazawa et al. | 204/1 T |
| 4,596,132 | 6/1986 | Takami et al. | 73/23 |
| 5,137,849 | 8/1992 | Brix et al. | 501/15 |
| 5,178,744 | 1/1993 | Nakazawa et al. | 204/425 |
| 5,228,975 | 7/1993 | Yamada et al. | 204/424 |
| 5,449,234 | 9/1995 | Gipp et al. | 374/185 |
| 5,670,032 | 9/1997 | Friese et al. | 204/424 |
| 5,739,414 | 4/1998 | Paulus et al. | 73/23.31 |
| 5,858,895 | 1/1999 | Sagara et al. | 501/77 |

*Primary Examiner*—Karl Group
*Attorney, Agent, or Firm*—Rankin, Hill, Porter & Clark LLP

[57] ABSTRACT

The present invention provides high temperature sealing glass compositions for use in producing mechanically and chemically durable electrically insulating hermetic glass seals between materials such as zirconia, alumina, fosterite, steatite, carbon steels, stainless steels, and superalloys. High temperature sealing glass compositions according to the present invention include a glass component and optional vehicles. The glass component includes one or more glass frits containing in weight percent from about 17% to about 56% BaO+SrO, from about 18% to about 60% $SiO_2$, from about 6% to about 36% $B_2O_3$, from about 2% to about 32% $Al_2O_3$, from about 0% to about 25% CaO plus MgO, from about 0% to about 20% $Y_2O_3$, from about 0% to about 7% $ZrO_2$, from about 0% to about 3% alkali oxides, from about 0% to about 5% $Co_3O_4$, from about 0% to about 5% NiO, and from about 0% to about 3% $MoO_3$. Upon firing, high temperature sealing glass compositions of the present invention produce mechanically and chemically durable hermetic glass seals which exhibit electrical resistance of greater than about 30 megaohms when measured at room temperature.

20 Claims, No Drawings

HIGH TEMPERATURE SEALING GLASS

FIELD OF INVENTION

The present invention concerns high temperature sealing glass compositions. More particularly, the present invention concerns high temperature sealing glass compositions which produce mechanically and chemically durable electrically insulating hermetic glass seals between materials such as zirconia, alumina, carbon steels, steatite, fosterite, stainless steels, and superalloys such as Inconel™.

BACKGROUND

Sealing glasses are commonly used in the construction of high temperature electronic devices such as oxygen sensor units which are used to measure the concentration of oxygen remaining in exhaust gases discharged from internal combustion engines and blast furnaces. U.S. Pat. Nos. 4,571,285, 4,596,132, 5,670,032, and 5,739,414 each describe various oxygen sensor units employing sealing glasses. The purpose of sealing glasses in these applications is to isolate the sensing portion of the oxygen sensor unit from an air reference chamber within the sensor unit. Upon firing, the glass seal forming composition melts and flows to join together the materials from which the sensor unit is constructed and form a hermetic seal. The glass seal thus formed prevents exhaust gas in the sensing portion of the sensor unit from leaking into and contaminating the air reference within the sensor unit. Any leakage of exhaust gas into the air reference within the sensor unit would detrimentally affect the validity of the measurement output of the sensor.

It is generally known in the art that in order to produce an effective glass seal between materials, a sealing glass composition must possess a coefficient of thermal expansion which is relatively intermediate between the coefficients of thermal expansion of the materials being sealed together. In general, oxygen sensor units are constructed of ceramic materials such as zirconia, alumina, fosterite and steatite, and metallic materials such as carbon and alloy steels, stainless steel and Inconel™. Joining ceramic materials such as zirconia, alumina, or steatite to metallic materials such as steel or Inconel™ requires sealing glasses to possess a relatively wide range of coefficient of thermal expansion, i.e. in the range of about $45 \times 10^{-7}/°$ C. to about $95 \times 10^{-7}/°$ C., more closely matching the coefficients of thermal expansion of the ceramic material in order to minimize the risk of fracture and residual stress.

The prior art describes several sealing glasses having relatively high coefficients of thermal expansion. Representative examples include the sealing glasses disclosed in U.S. Pat. Nos. 2,642,633; 3,123,470; 3,258,350; and 3,951,669. However, these prior art sealing glasses possess relatively low softening temperatures of about 500° C., making them unsuitable for use in high temperature applications such as in oxygen sensor units where the exhaust gases being sensed may reach temperatures as high as 900° C. or higher, and the glass seals within the unit may be exposed to temperatures as high as about 650° C. At these high operating temperatures, glass seals formed from prior art sealing glasses deform and flow resulting in seal failure.

In addition to having compatible coefficient of thermal expansion and a relatively high glass transition temperature, in order to be suitable for application in high temperature electronic devices such as oxygen sensor units, a sealing glass composition must form a mechanically and chemically durable glass seal which exhibits high electrical resistance at elevated temperatures. These additional requirements necessitate that the seating glass be comprised of a silicate-based glass or glass ceramic composition, but precludes the sealing glass composition from containing any significant concentrations of alkali metal oxides, or admixtures of electrically conductive metal powders as described in U.S. Pat. No. 4,221,604. Additionally, due to manufacturing process constraints, a sealing glass composition must also be capable of melting and flowing to form a glass seal at a firing temperature between 900° and 1,050° C.

SUMMARY OF THE INVENTION

The present invention provides new high temperature sealing glass compositions which are especially well-suited for use in high temperature electronic devices such as oxygen sensor units. High temperature sealing glass compositions according to the present invention possess high electrical resistance at elevated temperatures, yet melt and seal at below 1,050° C. to ceramic materials such as steatite, alumina, fosterite and zirconia, and to metallic materials such as steels and superalloys such as Inconel™. Upon firing, high temperature sealing glass compositions of the present invention form glass seals which are mechanically and chemically durable enough to withstand the harsh environments found in automotive and industrial exhaust systems.

High temperature sealing glass compositions according to the present invention contain very little, and preferably no, alkali metal oxides, have moderate coefficients of thermal expansion in the range of about $45 \times 10^{-7}/°$ C. to about $90 \times 10^{-7}/°$ C., and relatively low viscosities in the range of about $10^{-2}$ to about $10^{-4}$ poise within a sealing temperature range of from about 900° C. to about 1,050° C. High temperature sealing glass compositions according to the present invention comprise a glass component comprising in weight percent from about 17% to about 56% BaO+SrO, from about 18% to about 60% $SiO_2$, from about 6% to about 36% $B_2O_3$, from about 2% to about 32% $Al_2O_3$, from about 0% to about 25% of a combined level of CaO and MgO, from about 0% to about 20% of a combined level of $Y_2O_3$ and $La_2O_3$, 0% to about 7% $ZrO_2$, from about 0% to about 3% alkali oxides, from about 0% to about 5% $Co_3O_4$, from about 0% to about 5% NiO, and from about 0% to about 3% $MoO_3$.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION

The novel high temperature sealing glass compositions of the present invention are particularly well-suited for applications such as forming mechanically and chemically durable electrically insulating hermetic glass seals in high temperature electronic devices such as oxygen sensor units. The disclosures of U.S. Pat. Nos. 4,571,285, 4,596,132, 5,670,032, and 5,739,414 are hereby incorporated by reference for their teachings relative to the configuration and construction of oxygen sensor units. However, because the compositions are capable of forming durable hermetic glass seals between a variety of materials, such as zirconia, alumina, steatite, fosterite steels, and superalloys such as Inconel™, they are also suitable for other applications as well.

The high temperature sealing glass compositions of the present invention comprise a glass component, optional vehicles and optional inorganic fillers. Preferably, the glass component provides a composition as follows:

| Component | Range (Wt %) | Preferred Range (Wt %) |
|---|---|---|
| BaO + SrO | 17–56 | 20–45 |
| $SiO_2$ | 18–60 | 30–50 |
| $B_2O_3$ | 6–36 | 7–30 |
| $Al_2O_3$ | 2–32 | 3–25 |
| CaO + MgO | 0–25 | 0–20 |
| $Y_2O_3$ | 0–20 | 0–18 |
| $ZrO_2$ | 0–7 | 0.5–4 |
| Alkali oxides ($Li_2O + Na_2O + K_2O$) | 0–3 | 0–1.5 |
| $Co_3O_4$ | 0–5 | 0–3 |
| NiO | 0–5 | 0–3 |
| $MoO_3$ | 0–3 | 0–1.5 |

In order to obtain high electrical resistance at elevated temperatures, the glass component must contain little, and preferably no, alkali metals or oxides such as $Li_2O$, $Na_2O$, $K_2O$, or $Cs_2O$. Good chemical durability requires that the glass component be a silicate based glass or glass ceramic composition. In order to join ceramic materials such as zirconia, alumina, fosterite or steatite to metallic materials such as carbon steels, alloy steels, stainless steels and superalloys such as Inconel™, the glass component must have a coefficient of thermal expansion in the range of from about $45 \times 10^{-7}$/° C. to about $95 \times 10^{-7}$/° C. within a temperature range of from about 25° C. to about 300° C., preferably a coefficient of thermal expansion in the range of from about $50 \times 10^{-7}$/° C. to about $90 \times 10^{-7}$/° C. within a temperature range of from about 25° C. to about 300° C., more closely matching the coefficient of thermal expansion of the ceramic material to minimize the risk of fracture and residual stress. Since the composition is intended for use in high temperature applications, the composition must have a dilatometric glass transition temperature in the range of from about 550° C. to about 850° C., and preferably from about 585° C. to about 790° C. However, due to constraints imposed by manufacturers of electronic devices, the maximum firing temperature of the composition must be less than about 1,050° C. In order to promote better adherence to stainless steels, such as 430 stainless steel, and to improve wetting characteristics on ferritic materials, a number of adherent promoting oxides, such as for example $CO_3O_4$, NiO, and $MoO_3$, can be included in the glass component. In order to increase the chemical durability, $Y_2O_3$ and $La_2O_3$ can be included in the glass component.

The glass frit or frits that comprise the glass component may be prepared utilizing conventional glass melting techniques. A conventional ceramic refractory, fused silica, or platinum crucible may be used to prepare the glass frit. Typically, selected oxides are smelted at temperatures of from about 1400° C. to about 1600° C. for 60 minutes. The molten glass formed in the crucible is then converted to glass frit using water-cooled steel rollers or water quenching. It will be appreciated that the step of producing the glass frit is not per se critical and any of the various techniques well-known to those skilled in the art can be employed.

In addition to the glass component, the high temperature sealing glass composition may also comprise optional vehicles. Water is a preferred vehicle, however a wide variety of other vehicles which are known in the art, such as alcohols, turpentine, and polysorbate, may be used. It will be appreciated that the amount and type of vehicle used, if any, will depend upon the particular application and the handling properties of the high temperature sealing glass composition needed therefor. In many applications the glass composition is used in the form of a shaped and sintered preform. When making preforms, inorganic fillers such as alumina, zirconia and cordierite can be added to the glass to tailor flow and thermal expansion characteristics. Preforms are made using the glasses of the present invention by pressing the glass to the desired shape and then sintering it at about 600–750° C. for about 30–60 minutes.

The following examples are intended only to illustrate the invention and should not be construed as imposing limitations upon the claims:

EXAMPLE 1

Glass Frits 1, 2 and 3, having the following compositions by weight percent, were each prepared using conventional glass melting techniques:

| Oxide | 1 | 2 | 3 |
|---|---|---|---|
| $SiO_2$ | 39.8 | 43.5 | 37.0 |
| BaO | 36.5 | 32.3 | 38.0 |
| $B_2O_3$ | 8.7 | 7.7 | 10.0 |
| $Al_2O_3$ | 6.3 | 8.8 | 5.0 |
| CaO | 7.0 | 6.2 | 8.0 |
| $ZrO_2$ | 1.7 | 1.5 | 2.0 |

Glass frits 1, 2, and 3 possessed the following properties (CTE Coefficient of Thermal Expansion in the range from 50° C. to 300° C.; $T_g$=Glass Transition Temperature; DSP= Dilametric Softening Point):

| Properties | 1 | 2 | 3 |
|---|---|---|---|
| CTE ($\times 10^{-7}$/° C.) | 66.2 | 63.1 | 72.7 |
| $T_g$, ° C. | 659 | 680 | 670 |
| DSP, ° C. | 698 | 720 | 715 |

Upon firing, Glass Frits 1, 2, and 3 produced with (up to 15% loading) and without alumina or cordierite fillers mechanically and chemically durable hermetic glass seals between Inconel™, zirconia, alumina and 430 stainless steel. Each of the glass seals produced from Glass Frits 1, 2, and 3 exhibited electrical seal resistance of greater than about 30 megaohms when measured at room temperature.

EXAMPLE 2

Glass Frits 4, 5 and 6, having the following compositions by weight percent, were each prepared using conventional glass melting techniques:

| Oxide | 4 | 5 | 6 |
|---|---|---|---|
| $SiO_2$ | 27.0 | 30.0 | 37.0 |
| $B_2O_3$ | 25.0 | 25.0 | 30.0 |
| $Al_2O_3$ | 24.0 | 24.0 | 9.0 |
| SrO | 20.0 | 17.0 | 22.0 |
| $ZrO_2$ | 4.0 | 4.0 | 2.0 |

Glass frits 4, 5, and 6 possessed the following properties:

| Properties | 4 | 5 | 6 |
|---|---|---|---|
| CTE ($\times 10^{-7}$/° C.) | 51.6 | 49.5 | 48.1 |
| $T_g$, ° C. | 651 | 650 | 624 |
| DSP, ° C. | 705 | 710 | 665 |

Upon firing, Glass Frits 4, 5, and 6 with (up to 15% loading) and without alumina or cordierite as fillers produced mechanically and chemically durable hermetic glass seals between alumina, zirconia, Inconel™ and 430 stainless steel. Each of the glass seals produced from Glass Frits 4, 5, and 6 exhibited electrical seal resistance of greater than about 30 megaohms when measured at room temperature.

EXAMPLE 3

Glass Frits 7, 8 and 9, having the following compositions by weight percent, were each prepared using conventional glass melting techniques:

| Oxide | 7 | 8 | 9 |
|---|---|---|---|
| $SiO_2$ | 39.4 | 39.4 | 39.1 |
| BaO | 36 | 36 | 35.8 |
| $B_2O_3$ | 8.6 | 8.6 | 8.6 |
| $Al_2O_3$ | 6.2 | 6.2 | 6.2 |
| CaO | 6.9 | 6.9 | 6.9 |
| $ZrO_2$ | 0.9 | 0.9 | 0.9 |
| $Co_3O_4$ | 2.0 | 1.0 | 1.0 |
| NiO | — | 1.0 | 1.0 |
| $MoO_3$ | — | — | 0.5 |

Glass frits 7, 8, and 9 possessed the following properties:

| Properties | 7 | 8 | 9 |
|---|---|---|---|
| CTE ($\times 10^{-7}$/° C.) | 73.2 | 70.7 | 73.8 |
| $T_g$, ° C. | 666 | 657 | 664 |
| DSP, ° C. | 700 | 699 | 709 |

Upon firing, Glass Frits 7, 8, and 9 with (up to 15% loading) and without alumina or cordierite as fillers produced mechanically and chemically durable hermetic glass seals between zirconia and 430 stainless steel. Each of the glass seals produced from Glass Frits 7, 8, and 9 exhibited electrical seal resistance of greater than about 30 megaohms when measured at room temperature. Additional testing demonstrated that Glass Frits 7 and 8, and particularly Glass Frit 9, wetted and bonded to both 430 stainless steel and Inconel™ somewhat better than Glass Frits 1 through 6.

What is claimed is:

1. A high temperature sealing glass composition for use in producing mechanically and chemically durable electrically insulating hermetic glass seals between materials being sealed together, said sealing glass composition comprising a glass component comprising in weight percent from about 17% to about 56% BaO+SrO, from about 18% to about 60% $SiO_2$, from about 6% to about 36% $B_2O_3$, from about 2% to about 32% $Al_2O_3$, from about 0% to about 25% CaO+MgO, from about 0% to about 20% $Y_2O_3$, from about 0% to about 7% $ZrO_2$, from about 0% to about 3% alkali oxides, from about 0% to about 5% $Co_3O_4$, from about 0% to about 5% NiO, and from about 0% to about 3% $MoO_3$, wherein said glass component is comprised of one or more glass frits.

2. A high temperature sealing glass composition for use in producing mechanically and chemically durable electrically insulating hermetic glass seals between materials being sealed together, said sealing glass composition comprising:
  a glass component comprising in weight percent from about 17% to about 56% BaO+SrO, from about 18% to about 60% $SiO_2$, from about 6% to about 36% $B_2O_3$, from about 2% to about 32% $Al_2O_3$, from about 0% to about 25% CaO+MgO, from about 0% to about 20% $Y_2O_3$, from about 0% to about 7% $ZrO_2$, from about 0% to about 3% alkali oxides, from about 0% to about 5% $Co_3O_4$, from about 0% to about 5% NiO, and from about 0% to about 3% $MoO_3$, and;
  a vehicle.

3. A high temperature sealing glass composition for use in producing mechanically and chemically durable electrically insulating hermetic glass seals between materials being sealed together, said sealing glass composition comprising:
  a glass component comprising in weight percent from about 17% to about 56% BaO+SrO, from about 18% to about 60% $SiO_2$, from about 6% to about 36% $B_2O_3$, from about 2% to about 32% $Al_2O_3$, from about 0% to about 25% CaO+MgO, from about 0% to about 20% $Y_2O_3$, from about 0% to about 7% $ZrO_2$, from about 0% to about 3% alkali oxides from about 0% to about 5% $Co_3O_4$, from about 0% to about 5% NiO, and from about 0% to about 3% $MoO_3$, and;
  one or more fillers.

4. An oxygen sensor unit having a hermetic glass seal isolating a sensing portion of said unit from an air reference chamber within said unit, said hermetic glass seal being formed by firing a high temperature sealing glass composition comprising a glass component comprising in weight percent from about 17% to about 56% BaO+SrO, from about 18% to about 60% $SiO_2$, from about 6% to about 36% $B_2O_3$, from about 2% to about 32% $Al_2O_3$, from about 0% to about 25% CaO+MgO, from about 0% to about 20% $Y_2O_3$, from about 0% to about 7% $ZrO_2$, from about 0% to about 3% alkali oxides, from about 0% to about 5% $Co_3O_4$, from about 0% to about 5% NiO, and from about 0% to about 3% $MoO_3$.

5. The oxygen sensor unit according to claim 4 wherein said high temperature sealing glass composition comprises a glass component comprising in weight percent from about 20% to about 45% BaO+SrO, from about 30% to about 50% $SiO_2$, from about 7% to about 30% $B_2O_3$, from about 3% to about 25% $Al_2O_3$, from about 0% to about 20% CaO+MgO, from about 0% to about 10% $Y_2O_3$, from about 0.5% to about 4% $ZrO_2$, from about 0% to about 3% $Co_3O_4$, from about 0% to about 3% NiO, and from about 0% to about 1.5% $MoO_3$.

6. The high temperature sealing glass composition according to claim 1 further comprising a vehicle and/or one or more fillers.

7. The high temperature sealing glass composition according to claim 1 wherein said glass component has a coefficient of thermal expansion of from about $45\times 10^{-7}$/° C. to about $95\times 10^{-7}$/° C. within a temperature range of from about 25° C. to about 300° C.

8. The high temperature sealing glass composition according to claim 1 wherein said glass component has a dilatometric glass transition temperature range of from about 550° C. to about 850° C.

9. The high temperature sealing glass composition according to claim 1 wherein said glass component has a dilatometric glass transition temperature range of from about 585° C. to about 790° C.

10. The high temperature sealing glass composition according to claim 1 wherein said glass component upon melting has a viscosity of from about $10^{-2}$ to about $10^{-4}$ poise within a sealing temperature range of from about 900° C. to about 1,050° C.

11. The high temperature sealing glass composition according to claim 1 wherein said glass component subsequent to firing produces a glass seal having a room temperature electrical resistance of greater than about 30 megaohms.

12. The high temperature sealing glass composition according to claim 1 wherein said materials being sealed together are selected from the group consisting of zirconia, alumina, fosterite, steatite, carbon steels, stainless steels, and superalloys.

13. The high temperature sealing glass composition according to claim 1 wherein said glass component comprises in weight percent from about 20% to about 45% $BaO+SrO$, from about 30% to about 50% $SiO_2$, from about 7% to about 30% $B_2O_3$, from about 3% to about 25% $Al_2O_3$, from about 0% to about 20% $CaO+MgO$, from about 0% to about 15% $Y_2O_3$, from about 0.5% to about 4% $ZrO_2$, from about 0% to about 5% $Co_3O_4$, from about 0% to about 3% NiO, and from about 0% to about 3% $MoO_3$.

14. The high temperature sealing glass composition according to claim 3 wherein said glass component has a coefficient of thermal expansion of from about $45\times10^{-7}/°$ C. to about $95\times10^{-7}/°$ C. within a temperature range of from about 25° C. to about 300° C.

15. The high temperature sealing glass composition according to claim 3 wherein said glass component has a dilatometric glass transition temperature range of from about 550° C. to about 850° C.

16. The high temperature sealing glass composition according to claim 3 wherein said glass component has a dilatometric glass transition temperature range of from about 585° C. to about 790° C.

17. The high temperature sealing glass composition according to claim 3 wherein said glass component upon melting has a viscosity of from about $10^{-2}$ to about $10^{-4}$ poise within a sealing temperature range of from about 900° C. to about 1,050° C.

18. The high temperature sealing glass composition according to claim 3 wherein said glass component subsequent to firing produces a glass seal having a room temperature electrical resistance of greater than about 30 megaohms.

19. The high temperature sealing glass composition according to claim 3 wherein said materials being sealed together are selected from the group consisting of zirconia, alumina, fosterite, steatite, carbon steels, stainless steels, and superalloys.

20. The high temperature sealing glass composition according to claim 3 wherein said glass component comprises in weight percent from about 20% to about 45% $BaO+SrO$, from about 30% to about 50% $SiO_2$, from about 7% to about 30% $B_2O_3$, from about 3% to about 25% $Al_2O_3$, from about 0% to about 20% $CaO+MgO$, from about 0% to about 15% $Y_2O_3$, from about 0.5% to about 4% $ZrO_2$, from about 0% to about 5% $Co_3O_4$, from about 0% to about 3% NiO, and from about 0% to about 3% $MoO_3$.

* * * * *